(12) United States Patent
Nishiwaki

(10) Patent No.: US 10,839,693 B2
(45) Date of Patent: Nov. 17, 2020

(54) VEHICLE CONTROL DEVICE AND VEHICLE CONTROL METHOD

(71) Applicant: Mitsubishi Electric Corporation, Tokyo (JP)

(72) Inventor: Takeshi Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 411 days.

(21) Appl. No.: 15/793,143

(22) Filed: Oct. 25, 2017

(65) Prior Publication Data

US 2018/0342163 A1 Nov. 29, 2018

(30) Foreign Application Priority Data

May 24, 2017 (JP) .................................. 2017-102753

(51) Int. Cl.
| | | |
|---|---|---|
| G08G 1/00 | (2006.01) | |
| G08G 1/16 | (2006.01) | |
| G05D 1/00 | (2006.01) | |
| G08G 1/017 | (2006.01) | |
| G08G 1/0965 | (2006.01) | |
| G08G 1/09 | (2006.01) | |

(Continued)

(52) U.S. Cl.
CPC ........... *G08G 1/167* (2013.01); *G05D 1/0055* (2013.01); *G08G 1/017* (2013.01); *G08G 1/056* (2013.01); *G08G 1/091* (2013.01); *G08G 1/0965* (2013.01); *G08G 1/09675* (2013.01); *G08G 1/096725* (2013.01); *G08G 1/096791* (2013.01); *G08G 1/161* (2013.01); *G08G 1/162* (2013.01); *G08G 1/166* (2013.01)

(58) Field of Classification Search
CPC ............ G08G 1/167; G08G 1/096791; G08G 1/09675; G08G 1/096725; G08G 1/162; G08G 1/166; G08G 1/056; G08G 1/091; G08G 1/0965; G08G 1/161; G08G 1/017; G05D 1/0055
USPC ......................................................... 701/117
See application file for complete search history.

(56) References Cited

U.S. PATENT DOCUMENTS

| | | | | |
|---|---|---|---|---|
| 5,732,785 A | * | 3/1998 | Ran ....................... | B60R 19/205 180/271 |
| 2005/0231340 A1 | * | 10/2005 | Tauchi ................... | B60Q 9/008 340/435 |

(Continued)

FOREIGN PATENT DOCUMENTS

JP 2016-071568 A 5/2016

*Primary Examiner* — Khoi H Tran
*Assistant Examiner* — B M M Hannan
(74) *Attorney, Agent, or Firm* — Sughrue Mion, PLLC; Richard C. Turner

(57) ABSTRACT

A vehicle control device and a vehicle control method are configured: to perform passing vehicle determination to determine whether another vehicle is a passing vehicle, based on position data included in first communication data received from the other vehicle and also position data of an own-vehicle; to transmit second communication data including a result of the passing vehicle determination and the position data of the own-vehicle; and to perform oncoming vehicle determination to determine whether the other vehicle is an oncoming vehicle, based on the position data included in the second communication data received from the other vehicle and the position data of an own-vehicle.

6 Claims, 7 Drawing Sheets

(51) Int. Cl.
 *G08G 1/056* (2006.01)
 *G08G 1/0967* (2006.01)

(56) References Cited

U.S. PATENT DOCUMENTS

| | | | | |
|---|---|---|---|---|
| 2011/0313665 | A1* | 12/2011 | Lueke | G01S 13/931 |
| | | | | 701/301 |
| 2011/0313740 | A1* | 12/2011 | Ikeda | G05B 17/02 |
| | | | | 703/2 |
| 2012/0176254 | A1* | 7/2012 | Imanaga | G01C 21/3407 |
| | | | | 340/902 |
| 2013/0345944 | A1* | 12/2013 | Kasiraj | B60W 30/162 |
| | | | | 701/96 |
| 2014/0365104 | A1* | 12/2014 | Sasaki | B60W 30/18154 |
| | | | | 701/119 |
| 2016/0318511 | A1* | 11/2016 | Rangwala | B60W 50/14 |
| 2017/0017239 | A1* | 1/2017 | Kanai | G05D 1/0274 |
| 2017/0080952 | A1* | 3/2017 | Gupta | B60W 50/14 |
| 2017/0084174 | A1* | 3/2017 | Suzuki | B60W 30/00 |
| 2017/0101102 | A1* | 4/2017 | Matei | G08G 1/167 |
| 2017/0341642 | A1* | 11/2017 | Suzuki | B60W 30/09 |
| 2018/0081371 | A1* | 3/2018 | Bar-Tal | G05D 1/0253 |

* cited by examiner

VEHICLE CONTROL DEVICE AND VEHICLE CONTROL METHOD

BACKGROUND OF THE INVENTION

1. Field of the Invention

The present invention relates to a vehicle control device and a vehicle control method notifying a vehicle traveling on a bidirectional two-lane road that a passing vehicle exists ahead of this vehicle.

2. Description of the Related Art

On a bidirectional two-lane road, a passing vehicle (hereafter called a "first vehicle"), which attempts to pass a vehicle ahead of it by entering the oncoming lane from the traveling line, tends to be hidden behind the passing target vehicle (hereafter called a "second vehicle"), hence it is often difficult for a vehicle traveling in the oncoming lane (hereafter called a "third vehicle") to visually recognize the first vehicle. In this case, the worst case scenario is an occurrence of head-on collision of the first vehicle and the third vehicle.

In the case of a work site, such as a mine, where a plurality of unmanned vehicles autonomously travel without an operator steering, an operation control device configured to prohibit vehicles from traveling on the oncoming lane, when a passing vehicle is attempting to pass a vehicle in front, has been proposed (e.g. Japanese Patent Application Publication No. 2016-71568). The prior art according to Japanese Patent Application Publication No. 2016-71568, however, is based on the assumption that this technique is applied to a plurality of vehicles which are under control, and is therefore difficult to be simply applied to vehicles where drivers are operating vehicles on general roads.

SUMMARY OF THE INVENTION

In order to prevent the above mentioned head-on collision of the first vehicle and the third vehicle from occurring on a bidirectional two-lane road, a possible method is issuance of a notification from the first vehicle to the third vehicle about the presence of the first vehicle by using a radio communication function between vehicles. To perform such communication effectively, radio communication between the first vehicle and the third vehicle has to be performed in a state where the first vehicle and the third vehicle are sufficiently distant from each other.

However, in a case where radio communication is performed between the first vehicle and the third vehicle in a state where the vehicles are sufficiently distant from each other, a large communicable area has to be ensured by, for example, increasing the transmission output of the radio communication, and as a result, congestion easily occurs in radio communication.

With the foregoing in view, it is an object of the present invention to provide a vehicle control device and a vehicle control method for notifying a vehicle which is traveling on a bidirectional two-lane road that a passing vehicle exists ahead of it, while relaxing the congestion of radio communication.

A vehicle control device according to the present invention is a vehicle control device that is to be connected with another vehicle control device, which is a vehicle control device equipped in another vehicle, such that radio communication therebetween is possible, when the other vehicle control device enters a communicable area, the vehicle control device including: a vehicle information acquiring unit that generates position data of an own-vehicle, the data including a current position thereof acquired at a present point of time by acquiring chronologically a position thereof, and a past position thereof acquired at a point of time before the present point of time, and transmits first communication data including the position data; a passing vehicle determining unit that receives the first communication data from the other vehicle control device, performs passing vehicle determination to determine whether the other vehicle, which has transmitted the first communication data, is a passing vehicle which is attempting to pass the own-vehicle, based on the position data included in the received first communication data, and the position data of the own-vehicle, and transmits second communication data including the result of the passing vehicle determination and the position data of the own-vehicle; and an oncoming vehicle determining unit that receives the second communication data from the other vehicle control device, and perform oncoming vehicle determination to determine whether the other vehicle, which has transmitted the second communication data, is an oncoming vehicle which faces the own-vehicle, based on the position data included in the received second communication data and the position data of the own-vehicle.

A vehicle control method according to the present invention is a vehicle control method performed in a configuration where a first vehicle and a second vehicle are to be connected such that radio communication therebetween is possible, when the second vehicle enters a communicable area of the first vehicle, and the second vehicle and a third vehicle are to be connected such that radio communication therebetween is possible, when the third vehicle enters a communicable area of the second vehicle, the method including: a step in which the first vehicle generates position data of the own-vehicle, the data including a current position thereof acquired at a present point of time by acquiring chronologically a position thereof, and a past position thereof acquired at a point of time before the present point of time, and transmits first communication data including the position data; a step in which the second vehicle generates position data of the own-vehicle, the data including a current position thereof acquired at a present point of time by acquiring chronologically a position thereof, and a past position thereof acquired at a point of time before the present point of time; a step in which the second vehicle receives the first communication data, performs passing vehicle determination to determine whether the first vehicle is a passing vehicle which is attempting to pass the second vehicle, based on the position data included in the received first communication data and the position data of the own-vehicle, and transmits second communication data including the result of the passing vehicle determination and the position data of the own-vehicle; a step in which the third vehicle generates position data of the own-vehicle, the data including a current position thereof acquired at a present point of time by acquiring chronologically a position thereof, and a past position thereof acquired at a point of time before the present point of time; and a step in which the third vehicle receives the second communication data, and performs on-coming vehicle determination to determine whether the second vehicle is an oncoming vehicle which faces the own-vehicle, based on the position data included in the received second communication data and the position data of the own-vehicle.

The present invention can provide a vehicle control device and a vehicle control method for notifying a vehicle traveling on a bidirectional two-lane road that a passing vehicle exists ahead of it, while relaxing the congestion of radio communication.

DESCRIPTION OF THE PREFERRED EMBODIMENTS

Preferred embodiments of a vehicle control device and a vehicle control method according to the present invention will be described with reference to the drawings. In the description of the drawings, identical portions or equivalent portions are denoted with same reference signs, where redundant description is omitted.

Embodiment 1

Figure 1:
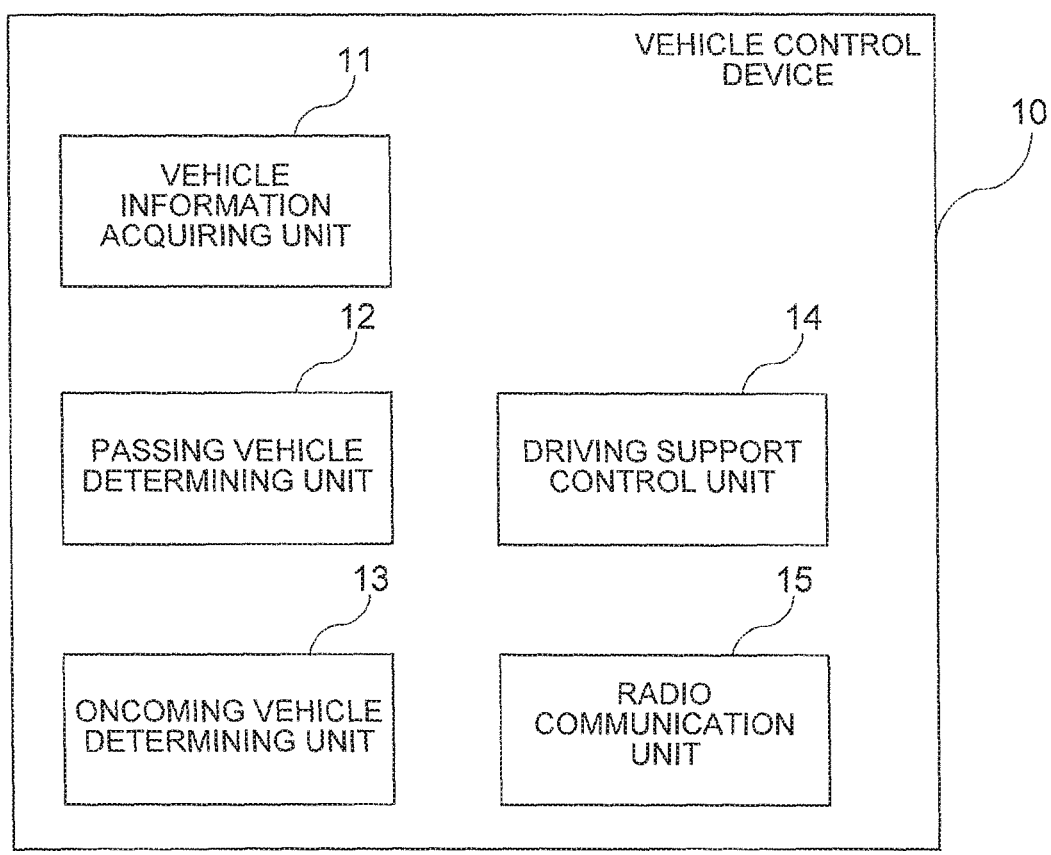
FIG. 1 is a block diagram depicting a configuration of a vehicle control device according to Embodiment 1 of the present invention.

FIG. 1 is a block diagram depicting a configuration of a vehicle control device 10 according to Embodiment 1 of the present invention. The vehicle control device 10 is equipped on a vehicle, and is comprised of, for example, a microcomputer that executes arithmetic processing, a read only memory (ROM) that stores such data as program data and fixed value data, a random access memory (RAM) that updates and sequentially overwrites the stored data, and a radio communication unit that sends and receives data.

The vehicle control device 10 includes a vehicle information acquiring unit 11, a passing vehicle determining unit 12, an oncoming vehicle determining unit 13, a driving support control unit 14, and a radio communication unit 15 constituted of a transmitter, a receiver, an antenna and the like.

The vehicle information acquiring unit 11 chronologically acquires the position of an own-vehicle (hereafter called "own-vehicle position"). For the method of acquiring the own-vehicle position, a known technique can be used, such as a technique of acquiring the own-vehicle position by receiving the position information from a Global Positioning System (GPS) satellite, which can communicate with the radio communication unit 15.

The vehicle information acquiring unit 11 chronologically acquires the own-vehicle position using the above mentioned technique, so as to generate position data including a current position which is the own-vehicle position acquired at a present point of time, and a past position which is the own-vehicle position acquired at a point of time before the present point of time. The timings to acquire the own-vehicle position can be designed arbitrarily.

The vehicle information acquiring unit 11 transmits first communication data T1, including the generated position data, to the communicable area by using the radio communication unit 15.

The passing vehicle determining unit 12 receives the first communication data T1 from a vehicle control device (hereafter called "another vehicle control device") equipped on another vehicle by using the radio communication unit 15. In other words, when the vehicle control device 10 enters a communicable area of another vehicle control device which transmits the first communication data T1, this other vehicle control device and the vehicle control device 10 are connected such that radio communication is possible. Therefore, the passing vehicle determining unit 12 of the vehicle control device 10 can receive the first communication data T1.

The passing vehicle determining unit 12 performs the passing vehicle determination to determine whether the other vehicle equipped with the other vehicle control device which has transmitted the first communication data T1, is a passing vehicle which is attempting to pass the own-vehicle, based on the position data included in the received first communication data T1 and the position data of the own-vehicle generated by the vehicle information acquiring unit 11.

The passing vehicle determining unit 12 transmits second communication data T2, including the result of the passing vehicle determination and the position data of the own-vehicle generated by the vehicle information acquiring unit 11, to the communicable area by using the radio communication unit 15.

The oncoming vehicle determining unit 13 receives the second communication data from the other vehicle control device by using the radio communication unit 15. In other words, when the vehicle control device 10 enters the communicable area of the other vehicle control device which transmits the second communication data T2, this other vehicle control device and the vehicle control device 10 are connected such that radio communication therebetween is possible. Therefore, the oncoming vehicle determining unit 13 of the vehicle control device 10 can receive the second communication data T2.

The oncoming vehicle determining unit 13 performs the oncoming vehicle determination to determine whether the other vehicle equipped with the other vehicle control device which has transmitted the second communication data T2 is the oncoming vehicle which faces the own-vehicle, based on the position data included in the received second communication data T2 and the position data of the own-vehicle generated by the vehicle information acquiring unit 11.

The driving support control unit 14 performs the driving support control corresponding to the presence of the passing vehicle for the driver of the own-vehicle in a case where the result of the oncoming vehicle determination indicates that the other vehicle which has transmitted the second communication data T2 is an oncoming vehicle, and the result of the passing vehicle determination included in the second communication data T2 indicates that the other vehicle which has transmitted the first communication data T1 is a passing vehicle.

In concrete terms, as an example of the driving support control, the driving support control unit 14 notifies a driver by using an alarm, voice, a screen display or the like, that a passing vehicle exists behind the oncoming vehicle.

Now, processing when a first vehicle 1, a second vehicle 2 and a third vehicle 3, which are traveling on the bidirectional two-lane road, are interconnected for communication via the vehicle control devices 10 equipped in the vehicles 1 to 3 respectively, will be described with reference to FIG. 2 and FIG. 3.

Figure 2:
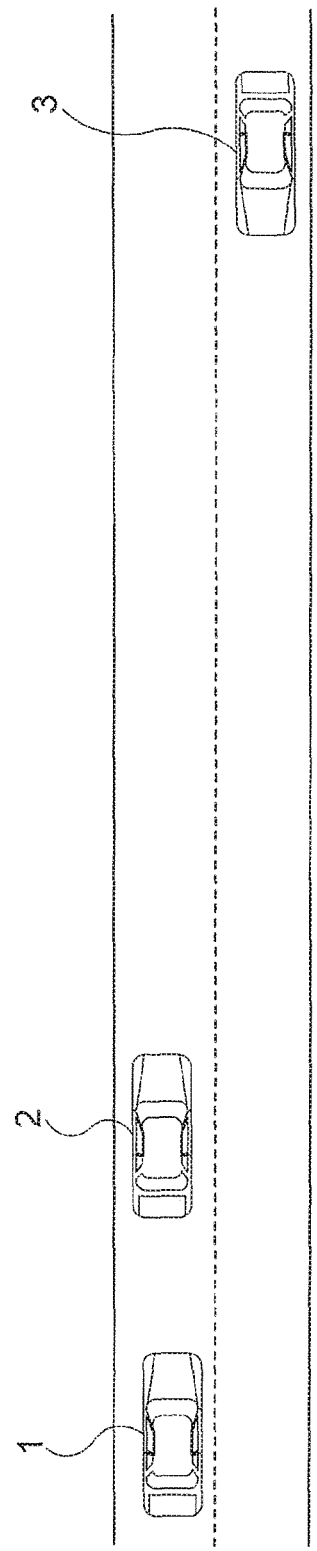
FIG. 2 is a diagram depicting an example of a positional relationship of each vehicle equipped with the vehicle control device according to Embodiment 1 of the present invention.

FIG. 2 is a diagram depicting an example of the positional relationship of each vehicle 1 to 3 equipped with a vehicle control device 10 according to Embodiment 1 of this invention. FIG. 3 is a block diagram excerpting the components of each vehicle control device 10, which function when the vehicle control device 10, equipped in each vehicle 1 to 3 illustrated in FIG. 2, is interconnected for communication.

Figure 3:
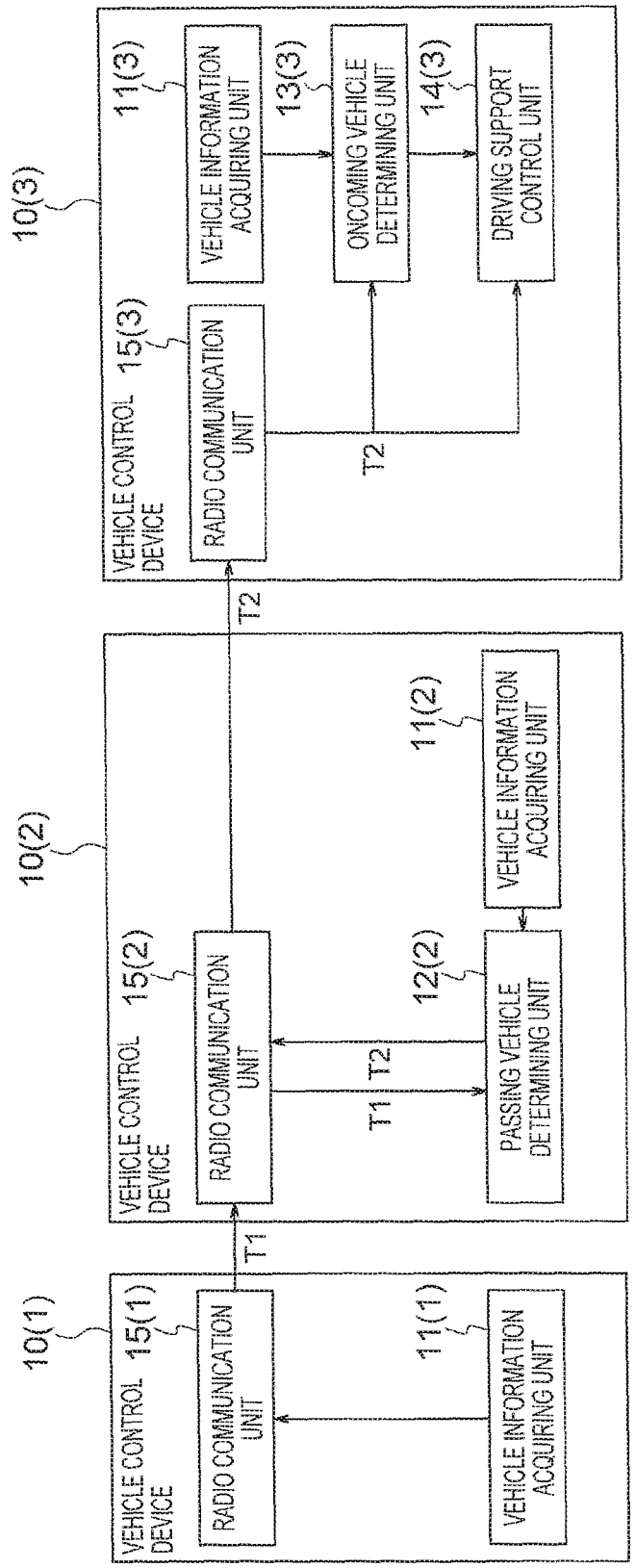
FIG. 3 is a block diagram excerpting the components of each vehicle control device, which function when the vehicle control device equipped in each vehicle, illustrated in FIG. 2, are interconnected for communication.

In FIG. 3, a reference number corresponding to each vehicle is tagged to each vehicle control device 10 and to the components of each vehicle control device 10, so as to distinguish each vehicle control device 10 equipped in each vehicle 1 to 3. For example, the vehicle control device 10 equipped in the first vehicle 1 is indicated as "vehicle control device 10 (1)", and the vehicle information acquiring unit 11 of the vehicle control device 10 (1) is indicated as "vehicle information acquiring unit 11 (1)".

In the positional relationship of the first vehicle 1 and the second vehicle 2, if the radio communication unit 15 (2) enters the communicable area of the radio communication unit 15 (1), the passing vehicle determining unit 12 (2) receives, via the radio communication unit 15 (2), the first communication data T1 which the vehicle information acquiring unit 11 (1) transmits via the radio communication unit 15 (1).

In this case, the passing vehicle determining unit 12 (2) performs the passing vehicle determination based on the position data included in the first communication data T1 received from the first vehicle 1 (that is, the position data of the first vehicle 1), and the position data generated by the vehicle information acquiring unit 11 (2) (that is, the position data of the second vehicle 2).

In this way, the first vehicle 1 generates the position data of the own-vehicle, and transmits the first communication data T1, including this position data, to the communicable area. When the second vehicle 2 enters the communicable area of the first vehicle 1, the first vehicle 1 and the second vehicle 2 are connected such that radio communication therebetween is possible, and the second vehicle 2 receives the first communication data T1. The second vehicle 2 generates the position data of the own-vehicle and performs the passing vehicle determination to determine whether the first vehicle is a passing vehicle, based on the position data included in the first communication data T1 and the position data of the own-vehicle.

Figure 4:
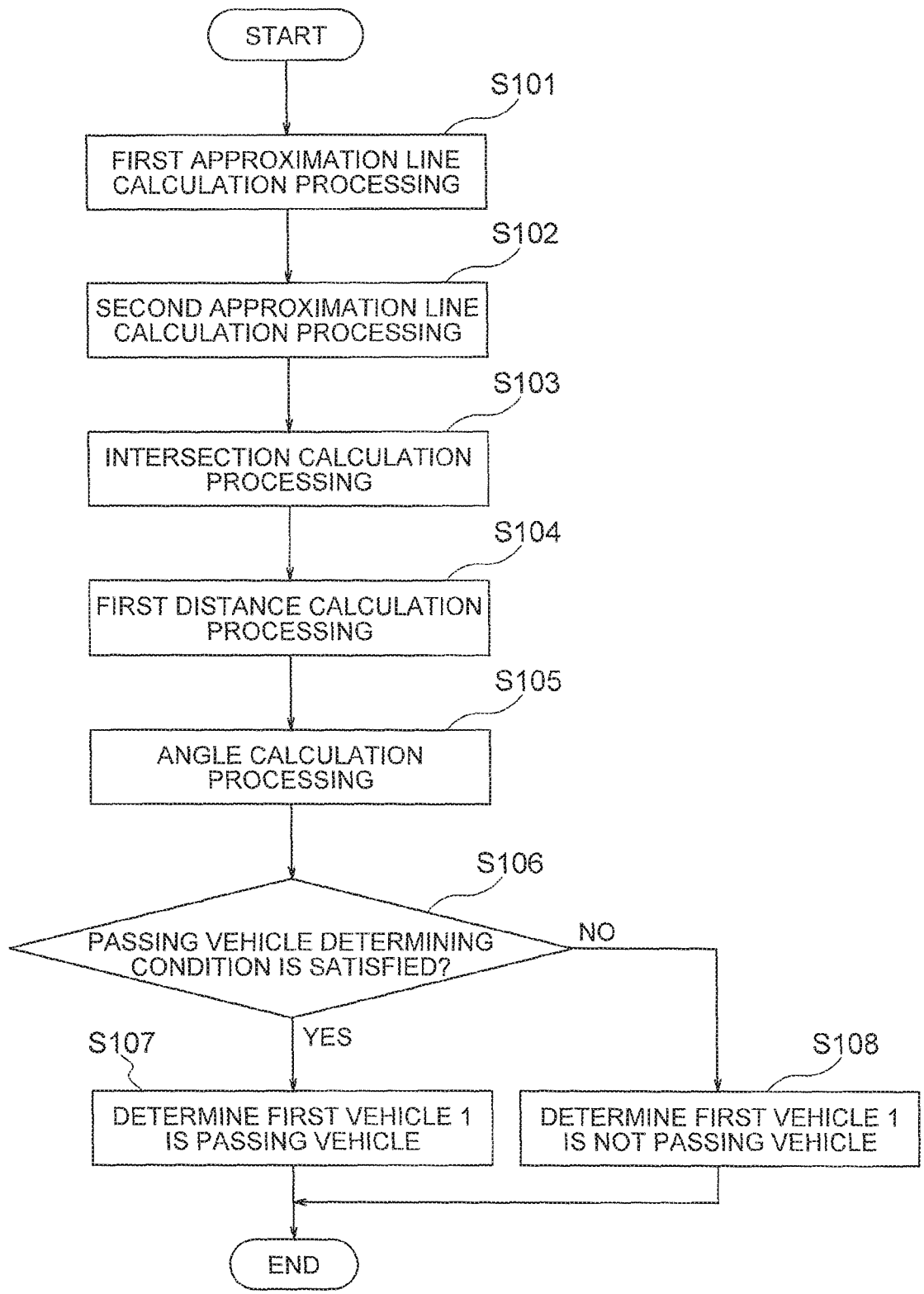
FIG. 4 is a flow chart depicting a passing vehicle determination, which is performed by the vehicle control device according to Embodiment 1 of the present invention.
Figure 5:
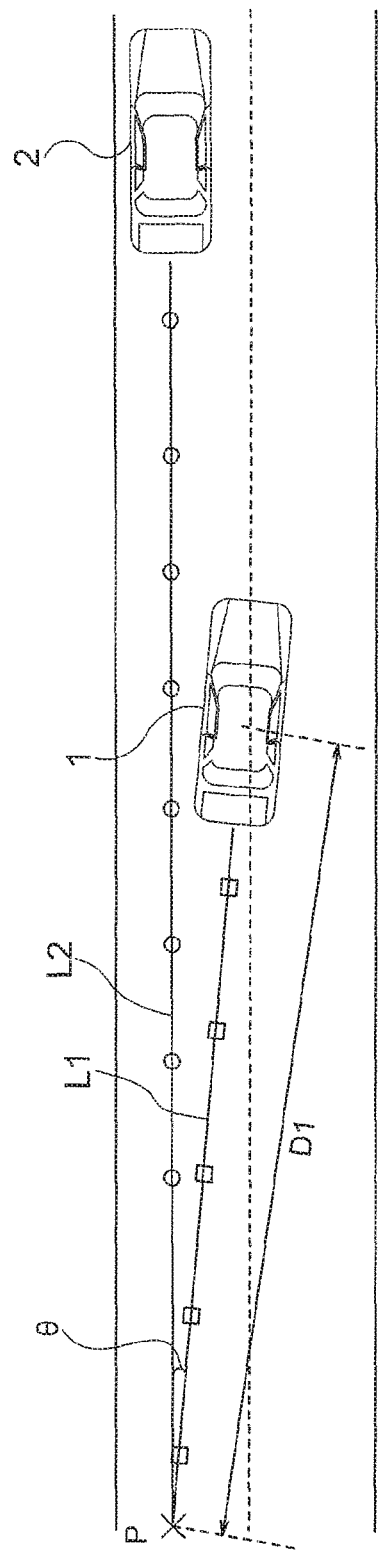
FIG. 5 is a diagram depicting a concept of the first approximation line and the second approximation line determined by the vehicle control device according to Embodiment 1 of the present invention.

Now, the passing vehicle determination will be described with reference to FIG. 4 and FIG. 5. FIG. 4 is a flow chart depicting the passing vehicle determination which is performed by the vehicle control device 10 according to Embodiment 1 of the present invention. FIG. 5 is a diagram depicting a concept of a first approximation line L1 and a second approximation line L2 determined by the vehicle control device 10 according to Embodiment 1 of the present invention.

A case where the vehicle control device 10 (2), which has received the first communication data T1 from the vehicle control device 10 (1), operates will be considered as a concrete example to describe FIG. 4 and FIG. 5. In FIG. 5, squares indicate past positions included in the position data of the first vehicle 1, and circles indicate past positions included in the position data of the second vehicle 2.

In step S101, as first approximation line calculation processing, the passing vehicle determining unit 12 (2) determines a first approximation line L1 by linearly approximating the past positions (see the squares in FIG. 5) of the position data included in the received first communication data T1, and processing advances to step S102. The number of data on the past positions used for the linear approximation to determine the first approximation line L1 can be designed arbitrarily.

In step S102, as second approximation line calculation processing, the passing vehicle determining unit 12 (2) determines a second approximation line L2 by linearly approximating the past positions (see the circles in FIG. 5) of the position data of the own-vehicle generated by the vehicle information acquiring unit 11 (2), and processing advances to step S103. The number of data on the past positions used for linear approximation to determine the second approximation line L2 can be designed arbitrarily.

In step S103, as intersection calculation processing, the passing vehicle determining unit 12 (2) determines an intersection P of the first approximation line L1 determined in step S101 and the second approximation line L2 determined in step S102, and processing advances to step S104.

In step S104, as first distance calculation processing, the passing vehicle determining unit 12 (2) determines a first distance D1 between the position of the intersection P determined in step S103, and the current position of the position data included in the first communication data T1 (that is, the current position of the first vehicle 1), and processing advances to step S105.

In step S105, as angle calculation processing, the passing vehicle determining unit 12 (2) determines an angle θ formed by the first approximation line L1 determined in step S101 and the second approximation line L2 determined in step S102, and processing advances to step S106.

In step S106, as passing vehicle determining processing, the passing vehicle determining unit 12 (2) determines whether a passing vehicle determination condition is satisfied, that is, whether the first distance D1, determined in step S104, is less than a first setting distance, and the angle θ determined in step S105 is included in a setting angle range.

If the first distance D1 is less than the first setting distance and if the angle θ is included in the setting angle range in step S106, it is determined that the passing vehicle determining condition is satisfied, and processing advances to step S107. On the other hand, if the first distance D1 is the first setting distance or more, or if the angle θ is not included in the setting angle range, it is determined that the passing vehicle determining condition is not satisfied, and processing advances to step S108.

The first setting distance and the setting angle range area are set in advance. Various methods are possible to set the first setting distance and the setting angle range, but the following setting method may be used. For example, a case where the first vehicle 1, which is travelling at 60 km/hour, passes the second vehicle 2, which is traveling in front of the first vehicle 1 at 50 km/hour, is considered. In this case, the time and distance required for this passing are 21.1 seconds and 360 m respectively. For the first vehicle 1 to pass the second vehicle 2, the first vehicle 1 enters the adjacent lane and returns to the own-lane. Generally the lane width is about double the width of a passenger vehicle, and the relative distance between the first vehicle and the second vehicle, when the first vehicle starts to pass and enters the oncoming lane, is ¼ the distance (=360 m/4=90 m) required for passing, hence the ¼ distance of the distance required for passing may be set as the first setting distance. While traveling a distance of 90 m, the first vehicle 1 horizontally shifts for ¼ of the lane width (standard lane width: 3.5 m), that is 3.5 m/4≅0.9 m, and the angle of the horizontal shift is $\sin^{-1}$ (0.9/90)≅0.57 deg. Therefore, it is assumed that this angle normally distributes in a 0 to 1.14 range with a 0.57 deg at the center, taking dispersion depending on the driver into consideration, and 1σ thereof is regarded as the setting angle range.

In this way, the passing vehicle determining unit 12 performs the passing vehicle determination based on the first distance D1 and the angle θ, determined from the position data included in the first communication data T1 and the position data of the own-vehicle.

In step S107, the passing vehicle determining unit 12 (2) determines that the first vehicle 1, which has transmitted the first communication data T1, is a passing vehicle. The passing vehicle determining unit 12 (2) also transmits the second communication data T2, which includes this determination result and the position data generated by the vehicle information acquiring unit 11 (2), to the communicable area via the radio communication unit 15 (2).

In step S108, the passing vehicle determining unit 12 (2) determines that the first vehicle 1, which has transmitted the first communication data T1, is not a passing vehicle. The passing vehicle determining unit 12 (2) also transmits the second communication data T2, which includes this determination result and the position data generated by the vehicle information acquiring unit 11 (2), to the communicable area via the radio communication unit 15 (2).

Returning to the descriptions on FIG. 2 and FIG. 3, if the radio communication unit 15 (3) enters the communicable area of the radio communication unit 15 (2) in the positional relationship of the second vehicle 2 and the third vehicle 3, the oncoming vehicle determining unit 13 (3) receives, via the radio communication unit 15 (3), the second communication data T2, which the passing vehicle determining unit 12 (2) transmits via the radio communication unit 15 (2).

In this case, the vehicle control device 10 (3) can recognize whether a passing vehicle is present or not, based on the result of the passing vehicle determination included in the received second communication data T2. In other words, whether a passing vehicle exists ahead or not is notified to the third vehicle 3 traveling on the bidirectional two-lane road.

Furthermore, the oncoming vehicle determining unit 13 (3) performs the oncoming vehicle determination based on the position data included in the second communication data T2 received from the second vehicle 2 (that is, the position data of the second vehicle 2), and the position data generated by the vehicle information acquiring unit 11 (3) (that is, the position data of the third vehicle 3).

In this way, the second vehicle 2 transmits the second communication data T2, including the result of the passing vehicle determination and the position data of the own-vehicle, to the communicable area. When the third vehicle 3 enters the communicable area of the second vehicle 2, the second vehicle 2 and the third vehicle 3 are connected such that radio communication therebetween is possible, and the third vehicle 3 receives the second communication data T2. The third vehicle 3 generates the position data of the own-vehicle, and performs the oncoming vehicle determination to determine whether the second vehicle 2 is the oncoming vehicle which faces the own-vehicle, based on the position data included in the second communication data T2 and the position data of the own-vehicle.

Figure 6:
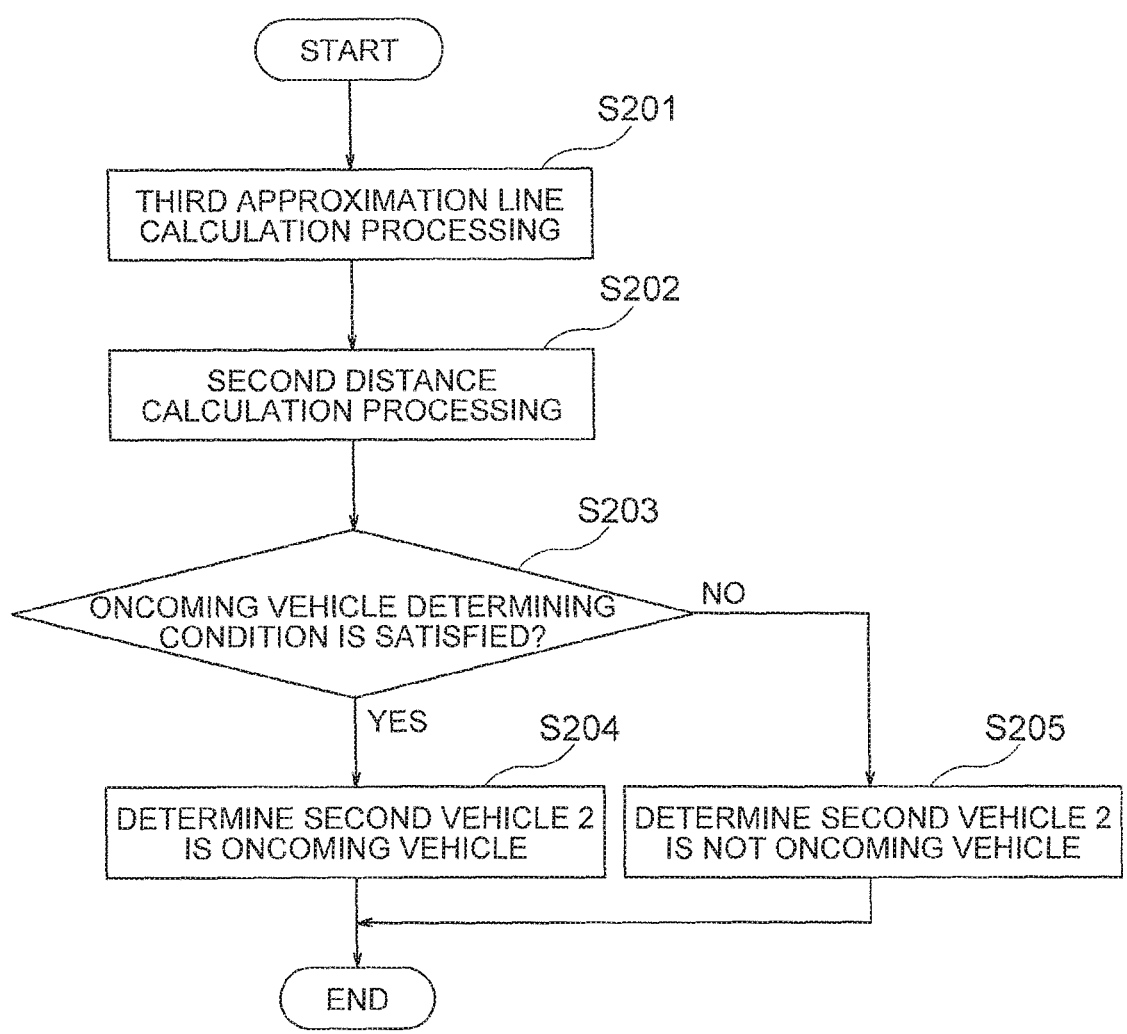
FIG. 6 is a flow chart depicting the oncoming vehicle determination performed by the vehicle control device according to Embodiment 1 of the present invention.
Figure 7:
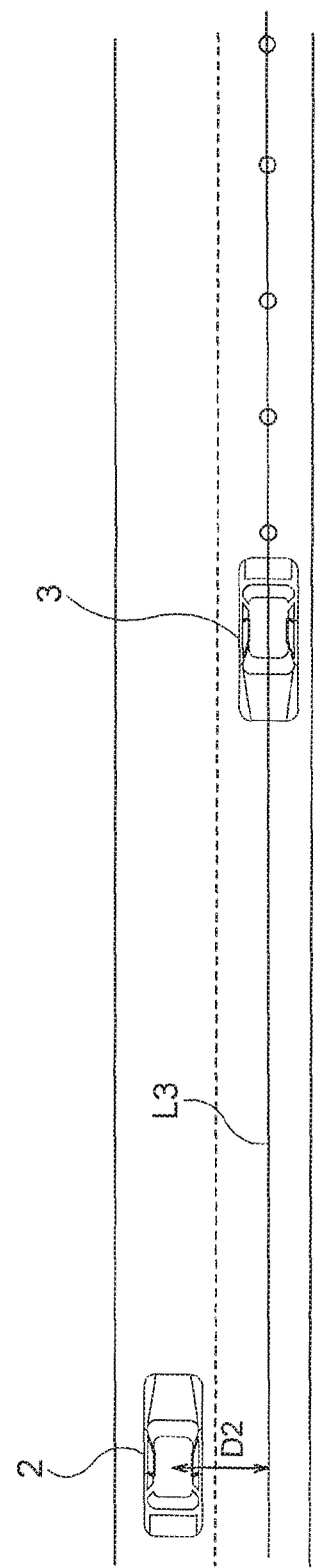
FIG. 7 is a diagram depicting a concept of the third approximation line determined by the vehicle control device according to Embodiment 1 of the present invention.

Now, the oncoming vehicle determination will be described with reference to FIG. 6 and FIG. 7. FIG. 6 is a flow chart depicting the oncoming vehicle determination, which is performed by the vehicle control device 10 according to Embodiment 1 of the present invention. FIG. 7 is a diagram depicting a concept of a third approximation line L3 determined by the vehicle control device 10 according to Embodiment 1 of the present invention.

A case where the vehicle control device 10 (3), which has received the second communication data T2 from the vehicle control device 10 (2), operates, will be considered to describe FIG. 6 and FIG. 7 as a concrete example. In FIG. 7, circles indicate past positions included in the position data of the third vehicle 3.

In step S201, as third approximation line calculation processing, the oncoming vehicle determining unit 13 (3) determines a third approximation line L3 by linearly approximating past positions (see the circles in FIG. 7) in the position data of the own-vehicle generated by the vehicle information acquiring unit 11 (3), and processing advances to step S202. The number of data on the past positions used for the linear approximation to determine the third approximation line L3 can be designed arbitrarily.

In step S202, as second distance calculation processing, the oncoming vehicle determining unit 13 (3) determines a second distance D2 between the current position of the position data included in the received second communication data T2 (that is, the current position of the second vehicle 2), and the third approximation line L3 determined in step S201, and processing advances to step S203.

In step S203, as oncoming vehicle determining processing, the oncoming vehicle determining unit 13 (3) determines whether the oncoming vehicle determining condition is satisfied, that is, whether the second distance D2 determined in step S202 is less than a second setting distance.

If the second distance D2 is less than the second setting distance in step S203, it is determined that the oncoming vehicle determining condition is satisfied, and processing advances to step S204. On the other hand, if the second distance D2 is the second setting distance or more, it is determined that the oncoming vehicle determining condition is not satisfied, and processing advances to step S205.

The second setting distance is set in advance. Various methods are possible to set the second setting distance, but the following setting method may be used. In a case where the second vehicle 2 is traveling on a road (e.g. a cross road) that is different from a road on which the third vehicle 3 is traveling, the advancing directions are different, hence the third approximation line L3 departs from the center of the second vehicle 2, and as a result, the second distance D2 increases. On the other hand, if the second vehicle 2 and the third vehicle are traveling as oncoming vehicles on a bidirectional two-lane road, as illustrated in FIG. 7, the second distance D2 is expected to be approximately less than the lane width. Therefore, 3.5 m, which is the lane with of a general road, is set as the second setting distance, for example.

In this way, the oncoming vehicle determining unit 13 performs the oncoming vehicle determination based on the second distance D2, determined from the position data included in the second communication data T2 and the position data of the own-vehicle.

In step S204, the oncoming vehicle determining unit 13 (3) determines that the second vehicle 2, which has transmitted the second communication data T2, is an oncoming vehicle, and outputs this determination result to the driving support control unit 14 (3).

In step S205, the oncoming vehicle determining unit 13 (3) determines that the second vehicle 2, which has transmitted the second communication data T2, is not an oncoming vehicle, and outputs this determination result to the driving support control unit 14 (3).

Returning to the description on FIG. 2 and FIG. 3, in a case where the result of the oncoming vehicle determination, which is inputted from the oncoming vehicle determining unit 13 (3), indicates that the second vehicle 2 is an oncoming vehicle, and the result of the passing vehicle determination included in the second communication data T2 indicates that the first vehicle 1 is a passing vehicle, the driving support control unit 14 (3) performs the driving support control for the driver of the third vehicle 3.

In concrete terms, as an example of the driving support control for the driver of the third vehicle 3, the driving support control unit 14 (3) notifies the driver that the first vehicle 1, which is the passing vehicle, exists behind the second vehicle 2, which is the oncoming vehicle.

As described above, Embodiment 1 is configured to execute processing of transmit the first communication data including the position data of the own-vehicle; processing of performing the passing vehicle determination to determine whether another vehicle, which has transmitted the first communication data, is a passing vehicle or not, based on the position data included in the first communication data received from the other vehicle and the position data of the own-vehicle, and transmitting the second communication data which includes the result of the passing vehicle determination and the position data of the own-vehicle; and processing of performing the oncoming vehicle determination to determine whether the other vehicle, which has transmitted the second communication data, is an oncoming vehicle or not, based on the position data included in the second communication data received from the other vehicle, and the position data of the own-vehicle.

Because of the features, in the abovementioned situation illustrated in FIG. 2, for example, the third vehicle can be notified that the first vehicle becomes the passing vehicle if the communicable area between the first vehicle and the second vehicle, and the communicable area between the second vehicle and the third vehicle, are ensured respectively. Hence the presence of a passing vehicle can be notified to a vehicle traveling on the oncoming lane, without increasing the respective communicable areas. As a result, the presence of a passing vehicle ahead can be notified to a vehicle traveling on a bidirectional two-lane road, while relaxing congestion of the radio communication.

Furthermore, in addition to this, the oncoming vehicle determination is performed, therefore if the second vehicle is not an oncoming vehicle relative to the third vehicle, the third vehicle can be prevented from recognizing the presence of a passing vehicle in error.

What is claimed is:

1. A vehicle control device that is to be connected with an other vehicle control device equipped in an other vehicle, such that radio communication is possible between the vehicle control device and the other vehicle control device, when the other vehicle control device enters a communicable area of the vehicle control device, the vehicle control device comprising a processor configured to:

generate position data of an own-vehicle, the position data including a current position of the own-vehicle acquired at a present point of time by acquiring chronologically a position of the own-vehicle, and a past position of the own-vehicle acquired at a point of time before the present point of time, and transmit first communication data including the position data of the own-vehicle;

receive other first communication data from the other vehicle control device, perform passing vehicle determination to determine whether the other vehicle, which has transmitted the other first communication data, is a passing vehicle which is attempting to pass the own-vehicle, based on other position data of the other vehicle included in the other first communication data received from the other vehicle control device, and the position data of the own-vehicle, and transmit second communication data including a result of the passing vehicle determination and the position data of the own-vehicle; and receive other second communication data from the other vehicle control device, and perform oncoming vehicle determination to determine whether the other vehicle, which has transmitted the other second communication data, is an oncoming vehicle which faces the own-vehicle, based on the other position data and the position data of the own-vehicle, wherein the processor is further configured to:

determine a first approximation line by linearly approximating a past position in the other position data included in the other first communication data;

determine a second approximation line by linearly approximating the past position in the position data of the own-vehicle;

determine an intersection between the first approximation line and the second approximation line;

determine a first distance between the intersection and a current position in the other position data included in the other first communication data:

determine an angle formed by the first approximation line and the second approximation line; and perform the passing vehicle determination based on the first distance and the angle.

2. The vehicle control device according to claim 1, wherein the processor is further configured to:

determine a third approximation line by linearly approximating the past position in the position data of the own-vehicle;

determine a second distance between a current position in the other position data included in the other second communication data and the third approximation line; and perform the oncoming vehicle determination based on the second distance.

3. The vehicle control device according to claim 1, wherein the processor is further configured to:

perform driving support control corresponding to the presence of the passing vehicle for a driver of the own-vehicle, in a case where the result of the oncoming vehicle determination indicates that the other vehicle, which has transmitted the other second communication data, is the oncoming vehicle, and the result of the passing vehicle determination included in the other second communication data indicates that a third vehicle, which has transmitted third first communication data, is the passing vehicle.

4. The vehicle control device according to claim 3, wherein as the driving support control, the processor is further configured to notify the driver that the third vehicle exists behind the other vehicle.

5. A vehicle control method performed in a configuration where a first vehicle and a second vehicle are connected for radio communication between the first vehicle and the second vehicle, when the first vehicle enters a communicable area of the second vehicle, and the second vehicle and a third vehicle are connected for radio communication between the second vehicle and the third vehicle, when the second vehicle enters a communicable area of the third vehicle, the method comprising:

a step in which the first vehicle generates first position data of the first vehicle, the first position data including a current position of the first vehicle acquired at a present point of time of the first vehicle by acquiring chronologically a position of the first vehicle and a past position of the first vehicle acquired at a point of time before the present point of time of the first vehicle, and transmits first communication data including the first position data;

a step in which the second vehicle generates second position data of the second vehicle, the second position data including a current position of the second vehicle acquired at a present point of time of the second vehicle by acquiring chronologically a position of the second vehicle, and a past position of the second vehicle acquired at a point of time before the present point of time of the second vehicle;

a step in which the second vehicle receives the first communication data from the first vehicle, performs passing vehicle determination to determine whether the first vehicle is a passing vehicle which is attempting to pass the second vehicle, based on the first position data included in the first communication data received from the first vehicle and the second position data of the second vehicle, and transmits second communication data including a result of the passing vehicle determination and the second position data of the second vehicle;

a step in which the third vehicle generates third position data of the third vehicle, the third position data including a current position of the third vehicle acquired at a present point of time of the third vehicle by acquiring chronologically a position of the third vehicle, and a past position of the third vehicle acquired at a point of time before the present point of time of the third vehicle; and a step in which the third vehicle receives the second communication data from the second vehicle, and performs on-coming vehicle determination to determine whether the second vehicle is an oncoming vehicle which faces the third vehicle, based on the second position data included in the second communication data received from the second vehicle and the third position data of the third vehicle, wherein the step in which the second vehicle receives the first communication data from the first vehicle further comprises:

determining a first approximation line by linearly approximating a past position in the other position data included in the other first communication data;

determining a second approximation line by linearly approximating the past position in the position data of the own-vehicle;

determining an intersection between the first approximation line and the second approximation line;

determining a first distance between the intersection and a current position in the other position data included in the other first communication data;

determining an angle formed by the first approximation line and the second approximation line; and performing the passing vehicle determination based on the first distance and the angle.

6. A vehicle control device that is to be connected with an other vehicle control device equipped in an other vehicle, such that radio communication is possible between the vehicle control device and the other vehicle control device, when the other vehicle control device enters a communicable area of the vehicle control device, the vehicle control device comprising a processor configured to:

generate position data of an own-vehicle, the position data including a current position of the own-vehicle acquired at a present point of time by acquiring chronologically a position of the own-vehicle, and a past position of the own-vehicle acquired at a point of time before the present point of time, and transmit first communication data including the position data;

receive other first communication data from the other vehicle control device, perform overtaking vehicle determination to determine whether the other vehicle, which has transmitted the other first communication data, is an overtaking vehicle which is attempting to overtake the own-vehicle, based on other position data of the other vehicle included in the other first communication data received from the other vehicle control device, and the position data of the own-vehicle, and transmit second communication data including a result of the overtaking vehicle determination and the position data of the own-vehicle; and receive other second communication data from the other vehicle control device, and perform oncoming vehicle determination to determine whether the other vehicle, which has transmitted the other second communication data, is an oncoming vehicle which faces the own-vehicle, based on the other position data and the position data of the own-vehicle, wherein the processor is further configured to:

determine a first approximation line by linearly approximating a past position in the other position data included in the other first communication data;

determine a second approximation line by linearly approximating the past position in the position data of the own-vehicle;

determine an intersection between the first approximation line and the second approximation line;

determine a first distance between the intersection and a current position in the other position data included in the other first communication data;

determine an angle formed by the first approximation line and the second approximation line; and perform the overtaking vehicle determination based on the first distance and the angle.

\* \* \* \* \*